United States Patent [19]

Mikolaicyk et al.

[11] Patent Number: 4,733,936

[45] Date of Patent: Mar. 29, 1988

[54] FIBER OPTIC CONNECTOR ASSEMBLY

[75] Inventors: John H. Mikolaicyk; Andrew Matzkin-Bridger, both of Oneonta, N.Y.

[73] Assignee: Amphenol Corporation, Wallingford, Conn.

[21] Appl. No.: 750,370

[22] Filed: Jun. 28, 1985

[51] Int. Cl.[4] .............................................. G02B 6/38
[52] U.S. Cl. .............................. 350/96.21; 350/96.18
[58] Field of Search ................ 350/96.20, 96.21, 96.18

[56] References Cited

U.S. PATENT DOCUMENTS

| 3,649,098 | 3/1972 | Suverison | 350/96 B |
|---|---|---|---|
| 3,944,327 | 3/1976 | Larsen | 350/96.21 |
| 3,990,779 | 11/1976 | McCartney | 350/96 C |
| 4,060,309 | 11/1977 | Le Noane et al. | 350/96 C |
| 4,119,362 | 10/1978 | Holzman | 350/96.21 |
| 4,147,402 | 4/1979 | Chown | 350/96.18 |
| 4,183,618 | 1/1980 | Rush et al. | 350/96.21 |
| 4,186,995 | 2/1980 | Schumacher | 350/96.20 |
| 4,190,316 | 2/1980 | Malsby et al. | 350/96.21 |
| 4,204,743 | 5/1980 | Etaix | 350/96.20 |
| 4,221,461 | 9/1980 | Bair | 350/96.21 |
| 4,252,406 | 2/1981 | Ryan, Jr. et al. | 350/96.21 |
| 4,255,016 | 3/1981 | Borsuk | 350/96.21 |
| 4,257,674 | 3/1981 | Griffin et al. | 350/96.21 |
| 4,265,511 | 5/1981 | Nicia et al. | 350/96.21 |
| 4,268,112 | 5/1981 | Peterson | 350/96.21 |
| 4,268,115 | 5/1981 | Siemon et al. | 350/96.21 |
| 4,269,648 | 5/1981 | Dakass et al. | 156/293 |
| 4,290,667 | 8/1981 | Chown | 350/96.18 |
| 4,291,941 | 9/1981 | Melzer | 350/96.21 |
| 4,325,607 | 4/1982 | Carlsen | 350/96.21 |
| 4,353,619 | 10/1982 | Parr | 350/96.21 |
| 4,371,233 | 2/1983 | Masuda | 350/96.21 |
| 4,420,219 | 12/1983 | Muchel | 350/96.21 |
| 4,421,383 | 12/1983 | Carlsen | 350/96.21 |
| 4,512,630 | 4/1985 | Runge | 350/96.21 |
| 4,563,057 | 1/1986 | Ludman et al. | 350/96.21 |

FOREIGN PATENT DOCUMENTS 2334969 12/1977 France .
2097149 10/1982 United Kingdom .

OTHER PUBLICATIONS

Serial No. 550,848, filed 11/14/1983, "A Lens Holder For a Fiber Optic Connector", Mikolaicyk and Krantz, Jr.

1979–The Optical Industry and Systems Directory–Dictionary p. D-15.

Primary Examiner—William L. Sikes
Assistant Examiner—Robert E. Wise
Attorney, Agent, or Firm—Bacon & Thomas

[57] ABSTRACT

An alignment bushing (40) having a frusto-conical entranceway (44,46) at each of its opposite end faces (41,43) with each entranceway receiving a frusto-conical lens (30) terminted to an optical fiber cable (16,26), the bushing optically aligning and coupling an optical signal passed between a fiber in each with each lens having its focal point (31) coaxially rearward of a hemispherical nose portion of the lens and abutting the fiber end. The frusto-conical cross-section defining the entranceway and lens conform identically to assure coaxial seating.

10 Claims, 2 Drawing Figures

FIBER OPTIC CONNECTOR ASSEMBLY

This invention relates to a fiber optic connector assembly and more particularly to an arrangement for aligning an optical signal passed between a pair of optical fibers.

Connector assemblies for coupling light transmission between a pair of optical fibers using lenses is known. In some situations, because of the lens size, standard electrical connectors must be unduly modified to accept the lens. Further, present lenses may have a concave focusing surface disposed within an interior passageway of a cylinder making molding thereof difficult.

A smaller, easier to mold lens, which would be capable of being mounted in a standard electrical connector but which is still precisely aligned, would be desirable.

According to this invention, a fiber optic connector assembly comprises a pair of optical fibers each being terminated by a frusto-conically shaped lens having a focal point, and a cylindrical alignment bushing including at each of its opposite ends a frusto-conical entranceway for seating each respective lens member. The lens includes a cylindrical portion coaxially aligned with the lens axis which extends rearwardly from the frusto-conical portion to a rearward end face which includes a conical recess adapted to seat the fiber end at the focal point of the lens.

One advantage of this invention is simplicity of design required of a lens mold while maintaining precise control over a very small lens. Another advantage of this is provision of an alignment arrangement adaptable to existing connector shell/insert configurations with adaptibility to a variety of lens and connector sizes.

The foregoing and other objects, features, and advantages of the invention will be apparent from the following description of the invention as illustrated in the accompanying drawings.

Figure 1:
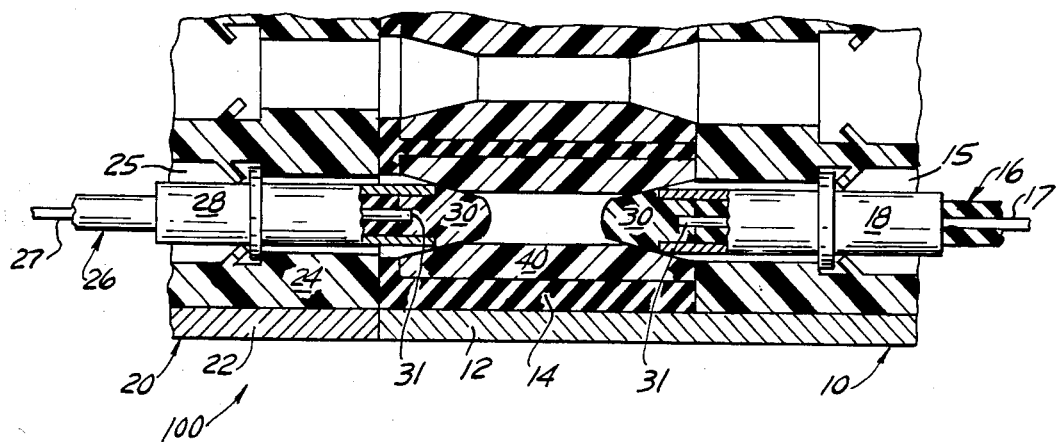
FIG. 1 is a partial side view in section of a fiber optic connector assembly.

Referring now to the drawings, FIG. 1 shows a mated fiber optic connector assembly 100 comprising a first and a second connector member 10,20, each connector member, respectively, including a connector shell 12,22, a dielectric insert 14,24 mounted in the shell, an optical fiber cable 16,26 mounted in each insert, and an alignment arrangement for optically aligning and coupling an optical signal passed from one fiber cable to the other fiber cable. Each fiber optic cable 16,26 includes, respectively, an outer insulator jacket which encircles a center optical fiber 17,27, each cable being terminated by a lens 30 and a generally cylindrical metal sleeve 18,28 which connects to the jacket and the lens.

Each insert 14,24 typically includes a respective plurality of passages 15,25 each being sized to receive a respective optical fiber and including a retention arrangement to retain the sleeves in the passage.

As shown, the alignment arrangement includes each fiber end being terminated by a lens 30 and an alignment bushing 40. Although the bushing is shown mounted in one passage 15 of an insert in the first connector member 10, its location could be otherwise. The bushing seats each lens whereby to align the optical axis of each fiber. Each lens 30 is comprised of a substantially transparent moldable optical material of suitable quality for transmitting a light therethrough and each lens 30 has a focal point 31 spaced coaxially from the end of the lens and at the fiber end face (see FIG. 2). For example, acrylic would be one suitable material. The bushing, while shown comprised of a like acrylic material, could be comprised of metal.

Figure 2:
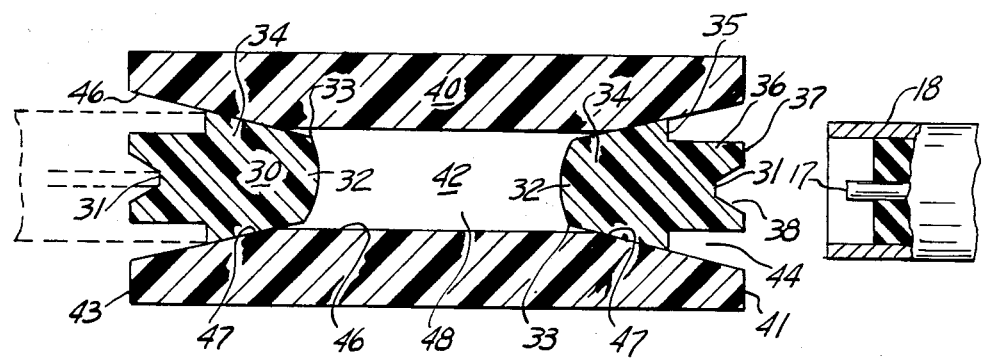
FIG. 2 is a section of a fiber alignment arrangement shown in FIG. 1.

FIG. 2 shows, in greater detail, the seating arrangement between the alignment bushing 40 and each lens 30. Each lens 30 includes three coaxially aligned portions, including a hemispherical forward portion 32 the major base for which being defined by a first diameter, a frusto-conical center portion 34 which expands uniformally radially outward from the first diameter to a first end face 35 defined by a second and greater diameter, and a cylindrical rearward portion 36 which extends rearwardly from the end face 35 to a second end face 37, the rearward portion being defined by a diameter less than the second diameter. A transition line 33 is defined at the first diameter by the intersection of the hemispherical forward portion with the surface of the frusto-conical center portion that extends rearwardly therefrom. The second end face 37, which is spaced rearwardly from the forward nose of the hemispherical forward portion, includes a conical recess 38 which extends forwardly inward therefrom, the recess being coaxially aligned with the axis of the lens and terminating at the focal point 31 of the lens against which the fiber end is abutted. This relation is shown by the phantom lines.

The forward portion 32 could be aspherical wherein the lens element is shaped to a surface of revolution about the lense axis, such as the conic section, but is not hemispherical. Aspherical surfaces serve to reduce spherical aberrations and still focus the wave. Such a shape allows ease of molding whereby centering is assured.

The alignment bushing 40 is generally cylindrical and comprises a central bore 42 which extends between the opposite end faces 41,43 of the bushing, the bore being coaxially aligned with the axis of the respective passage 15. The bore is frusto-conical in cross-section adjacent to each end face and tapers uniformally radially inward and axially from the respective end face whereby to intersect a cylindrical center passage 48 medially of the bushing. A pair of first transition lines 47 are defined at the intersection of the cylindrical center passage with the surfaces defining the frusto-conical portions of the bore.

The bushing 40 axially separates each lens 30 from one another and coaxially aligns the axis of each lens and its associated focal point 31 with one another and also with the axis defining the bore. Each frusto-conical surface leading into the bushing defines a first entranceway 44 and a second entranceway 46 for one and the other lens. Each frusto-conical surface defining the center portion 34 of the lens and the frusto-conical surface defining the first and second entranceway are adapted to conform identically.

When seated in the bushing, each lens coaxially aligned and axially separated. The transition line 33 of each lens is inwardly of the transition lines 47 of the bore.

What is claimed is:

1. In a fiber optic cable connector, means for effecting axial alignment of a pair of abutting generally cylindrical fiber optic cable termination sleeves in light transmission relationship, comprising:
    an elongated, generally cylindrical member including a bore having a central portion and two end portions, said central portion having a diameter less than that of each said end portion with each said end portion defining a frusto-conically shaped entranceway sized to receive a corresponding one of said pins, said pins being inserted therein and each said termination pin including a lens having a focal point, each said lens being generally frusto-conically shaped about a primary axis with the primary axis of each said lens and said member being in register when the lenses are received within the entranceway and the angle defining the frusto-conical surface of each said entranceway and respective lens conforming identically both axially and radially.

2. In combination, a first and a second connector member each having an insert, an optical fiber mounted in a passage of its insert, and alignment means for optically aligning and coupling a optical signal passed from one fiber to the other fiber, each said fiber being terminated by a lens of the type comprising a hemispherical portion defining a nose and being disposed in plane which defines a first diameter, and a frusto-conical body portion which expands uniformally radially outward from the first diameter to a second diameter, and the alignment means comprising a cylindrical bushing being mounted in a passage of one said insert and including a central bore extending between the end faces thereof and coaxially aligned with the passage of said insert, the bore being frusto-conical in cross-section to define a first and a second entranceway for seating each lens, the cross-section of each lens and entranceway conforming identically both radially and axially.

3. A fiber optic connector assembly, comprising a pair of optical fibers each being terminated by a conically shaped lens having a focal point, and a cylindrical bushing including a central bore extending between the ends thereof for axially aligning an optical signal passed between the fibers, said bore having a cross-section which tapers radially inward from one and the other end of said bushing whereby to define a frusto-conical entranceway at each said end, and each said lens, respectively, being seated within one said frusto-conical entranceway with the outer periphery of each conforming identically to the frusto-conical surface of its entranceway.

4. The connector assembly as recited in claim 3, wherein each said lens terminates in a hemispherical forward end portion at a location forwardly of its focal point.

5. The connector assembly as recited in claim 4, wherein said bore includes a center passage of a cylindrical cross-section, a pair of first transition lines are defined by the intersection of the frusto-conical surfaces defining the entranceways with the surface defining the center passage, and a second transition line is defined by the intersection of the hemispherical surface with that of the conical surface on said lens, said second transition line being disposed between the first transition lines.

6. The connector assembly as recited in claim 3 wherein each said lens terminates in an aspherical forward end portion at a location forwardly of its focal point.

7. The connector assembly as recited in claim 3, wherein the bushing axially separates each said lens and coaxially aligns each said lens and its associated focal point with one another and with bore axis.

8. The connector assembly as recited in claim 3, wherein each said lens includes a first end face facing rearwardly and a cylindrical portion which is coaxially aligned with the axis of the lens and which extends rearwardly therefrom to a second end face, said second end face including a conical recess which is aligned with the axis of the lens and which terminates at the focal point of the lens, each respective conical recess seating the end of its optical fiber at the focal point of its lens and the cylindrical portion mounting a contact member terminated to the optical fiber.

9. The connector assembly as recited in claim 3, wherein each said lens is comprised of a substantially transparent material of suitable quality for transmitting light therethrough.

10. The connector assembly as recited in claim 9 wherein said bushing is comprised of a substantially transparent material of suitable quality for transmitting light therethrough, the material being acrylic.

* * * * *